United States Patent
Jones et al.

(10) Patent No.: US 6,758,242 B2
(45) Date of Patent: Jul. 6, 2004

(54) SPRING-LOADED ROTATIONAL LIMIT STOP

(75) Inventors: Jacob Jones, Indianapolis, IN (US); Christopher W. Conlisk, Fishers, IN (US); Kyle H. McMains, Frankfort, IN (US); Gerald J. McNerney, Carmel, IN (US)

(73) Assignee: Masco Corporation of Indiana, Indianapolis, IN (US)

( * ) Notice: Subject to any disclaimer, the term of this patent is extended or adjusted under 35 U.S.C. 154(b) by 144 days.

(21) Appl. No.: 10/101,890

(22) Filed: Mar. 19, 2002

(65) Prior Publication Data

US 2003/0178072 A1 Sep. 25, 2003

(51) Int. Cl.[7] .............................................. F16K 11/078
(52) U.S. Cl. .................. 137/625.41; 251/285; 251/288
(58) Field of Search ........................ 137/625.17, 625.4, 137/625.41, 636, 637.2, 637.3; 251/285, 288

(56) References Cited

U.S. PATENT DOCUMENTS

| | | | | |
|---|---|---|---|---|
| 2,847,031 A | * | 8/1958 | Brown, Jr. ............. | 137/625.41 |
| 2,887,128 A | * | 5/1959 | Bloomberg ............ | 137/625.41 |
| 3,625,255 A | * | 12/1971 | Genin .................... | 137/625.41 |
| 3,674,048 A | * | 7/1972 | Manoogian et al. ... | 137/625.41 |
| 3,964,514 A | * | 6/1976 | Manoogian et al. ........ | 251/285 |
| 4,089,347 A | * | 5/1978 | Christo .................. | 137/625.41 |
| 4,423,752 A | * | 1/1984 | Psarouthakis .......... | 137/625.41 |
| 4,651,770 A | | 3/1987 | Denham et al. | |
| 4,751,943 A | * | 6/1988 | Chi ........................... | 251/288 |
| 4,813,455 A | * | 3/1989 | Iqbal ......................... | 251/288 |
| 4,901,750 A | | 2/1990 | Nicklas et al. | |
| 4,981,156 A | | 1/1991 | Nicklas et al. | |
| 5,326,075 A | * | 7/1994 | Goff ........................... | 251/285 |
| 5,340,018 A | * | 8/1994 | MacDonald ............... | 236/12.2 |
| 5,355,906 A | * | 10/1994 | Marty et al. ........... | 137/625.41 |
| 6,123,105 A | * | 9/2000 | Yang ..................... | 137/625.41 |

* cited by examiner

*Primary Examiner*—John Rivell
(74) *Attorney, Agent, or Firm*—Kwadjo Adusei-Poku; Lloyd D. Doigan

(57) ABSTRACT

A rotational limit stop comprising a substantially circular disc having an upper surface, a lower surface and a perimeter surface, the perimeter surface containing a plurality of teeth on one portion thereof, a central aperture passing through the center of the circular disc, and a plurality of resilient spring legs extending downwards from the lower surface of the disc, such that the resilient spring legs of the rotational limit stop flex to accommodate the compression forces as a faucet assembly containing the rotational limit stop is being assembled.

12 Claims, 3 Drawing Sheets

SPRING-LOADED ROTATIONAL LIMIT STOP

FIELD OF THE INVENTION

This invention relates to a spring-loaded disc having thereon a rotational limit stop for a faucet valve assembly.

BACKGROUND OF THE INVENTION

Primarily in single handle faucet assemblies where the valve hosts a temperature dial and a volume dial on the same faucet stem, the temperature mechanism and the volume mechanism are stacked on top of each other. As each of the respective volume and temperature components are designed to its respective tolerances, the cumulative tolerance effect can become large enough for a user to feel a wobble or slack within the faucet configuration. These loose controls are, unfortunately, interpreted as inferior in quality. However, without these tolerances, a faucet assembly may result, in which the controls are stiff or unmovable. In order to solve this problem, the industry has resorted to using a number of devices. For example, one proposed solution involved using a screw to take up the tolerance variations in the assembly. The screw tightened down the assembly until the temperature and volume controls moved in a satisfactory manner, according to the installer of the faucet. However, this method is highly subjective and depended upon the skill and "feel" of the installer, and oftentimes resulted in faucets in which the volume control seized to the temperature control as a result of an over-tightened screw.

Another solution involved the use of a foam gasket within the assembly in order to compensate for the gap designed into the stack configuration. Here, the stack was simply tightened together compressing the foam gasket. In this way, the gasket served to remove the slack and give the impression of a compact, well-constructed faucet, one without wobble. Although the foam gasket is a simple, inexpensive solution to this problem, the foam gasket tends to weather or permanently deform in the fluid environment of the faucet. As a result, the resilience of the foam is destroyed and the foam can no longer provide the cushioning forces required in the faucet stack. This would once again cause the wobble within the faucet assembly.

SUMMARY OF THE INVENTION

In order to solve the problems recited above, the instant invention discloses a spring-loaded disc having the rotational limit stops thereon. As proposed, a one-piece disc takes up the tolerance variation between the faucet components, as these components are stacked upon each other. This tolerance variation is converted into a constant force output targeted to provide the force required to achieve a moderate balance between the tolerance gap causing the volume control handle to wobble and the excessive interference caused by the over-tightening of the temperature knob.

BRIEF DESCRIPTION OF THE DRAWINGS

The many objects, features and advantages of the present invention will become apparent to one skilled in the art when the following detailed description of the preferred embodiment is read together with the attached drawing, wherein like reference numerals refer to like components throughout and wherein.

DESCRIPTION OF THE PREFERRED EMBODIMENT

Figure 1:
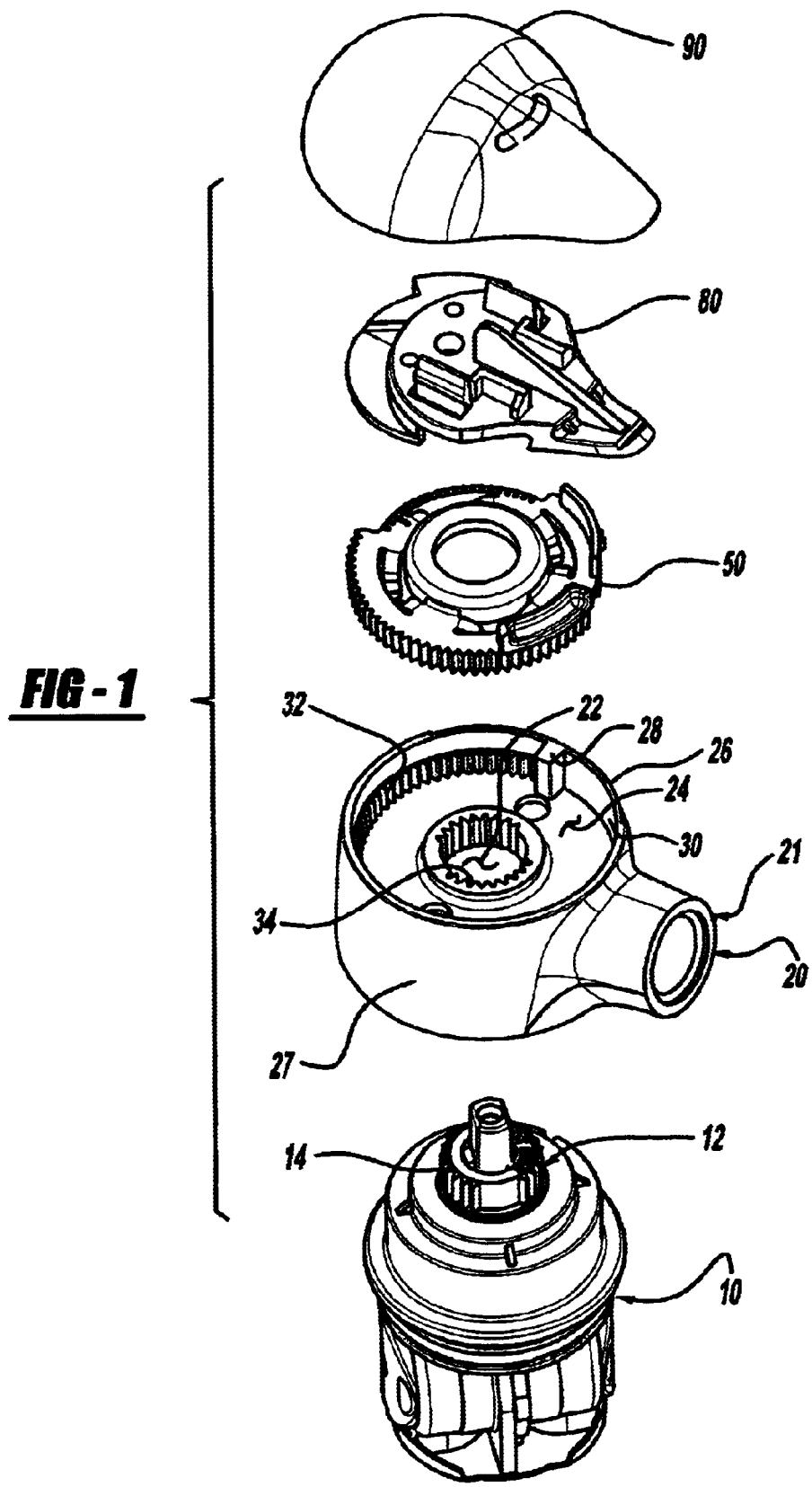
FIG. 1 is an exploded perspective view of the faucet assembly incorporating the spring-loaded disc according to the instant invention.

Referring to FIG. 1, the faucet assembly comprises a valve assembly 10, a flow control knob 20 fitted upon the valve assembly 10, a rotational limit stop 50 according to the invention and placed within the flow control knob 20, a temperature knob 80 placed upon the rotational limit stop 50, and a temperature knob cover 90. The flow control knob 20 comprises a central opening 22, a base surface 24 extending radially from the central opening 22, and a perimeter lip 26 projecting upwards and surrounding the base surface 24. The perimeter lip 26 forms the knob body 27. Extending from the flow control knob body 27 is a flow control handle 21. A cold temperature stop 28 extends inwards from the inner surface 30 of the perimeter lip 26. Also along the inner surface 30 of the perimeter lip 26 are a plurality of engaging ridges 32. As shown in FIG. 1, the engaging ridges 32 extend from the cold temperature stop 28 partially around the inner circumference of the perimeter lip 26. Although not shown in FIG. 1, it is possible for the engaging ridges 32 to extend entirely around the inner surface of the perimeter lip 26.

The central opening 22 contains a plurality of mating ridges 34 around its perimeter. The central aperture 22 is sized so as to matingly engage a valve sprocket 12 extending from the top of valve assembly 10. As the flow control knob 20 is placed upon the valve assembly 10, the teeth 14 around the valve sprocket 12 engage the mating ridges 34 of the flow control knob 20, allowing the flow control knob 20 to adjust the valve by rotating the flow control knob 20.

Figure 2:
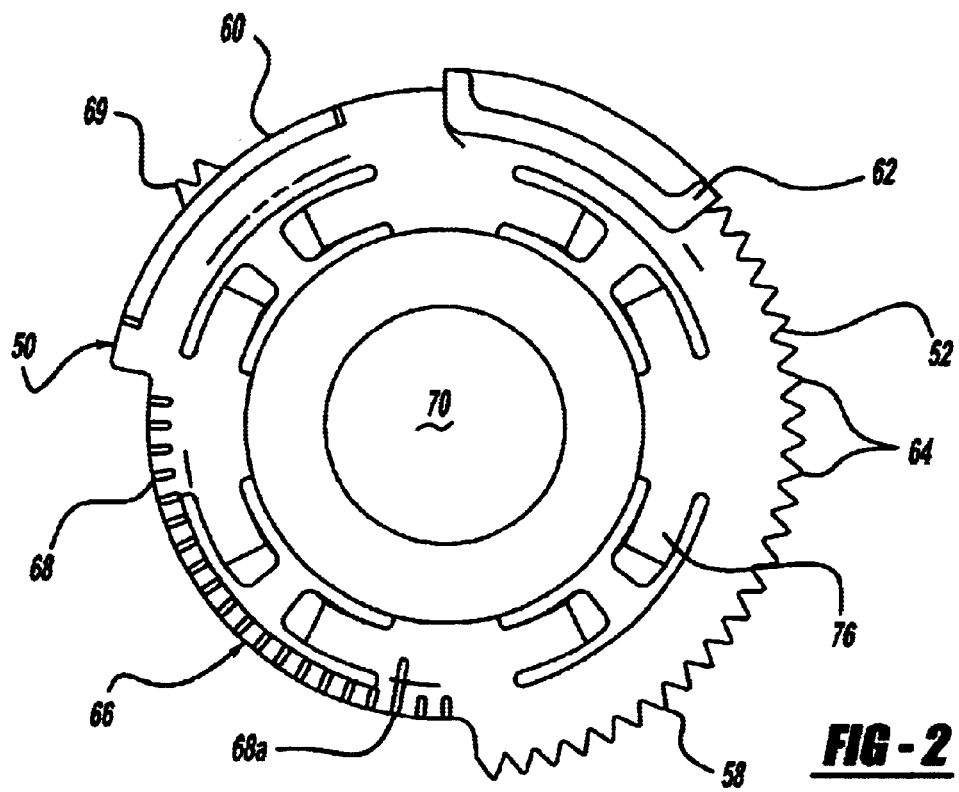
FIG. 2 is a top plan view of the spring-loaded disc according to the instant invention.
Figure 3:
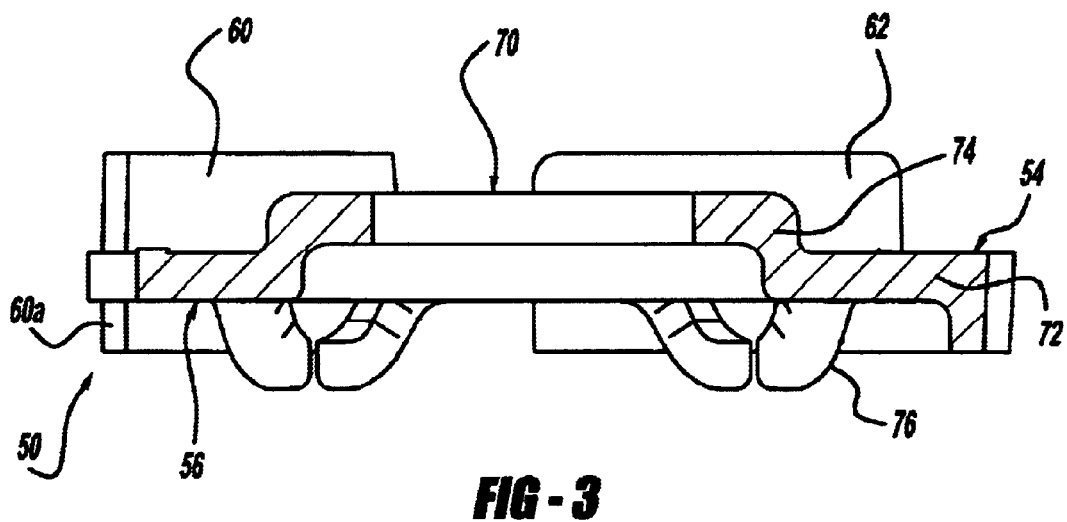
FIG. 3 is a sectional view of the spring-loaded disc according to the instant invention taken along the line 33.
Figure 4:
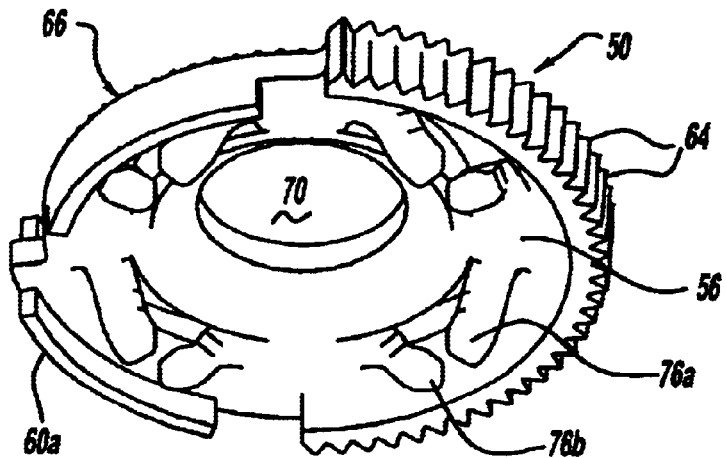
FIG. 4 is a bottom perspective view of the spring-loaded disc according to the instant invention.

The rotational limit stop 50 is sized to be received within the perimeter lip 26 of the flow control knob 20. Referring also to FIGS. 2–4, the rotational limit stop 50 comprises a substantially circular disc 52 having an upper surface 54, a lower surface 56, and an outer circumference 58. Extending upwards from the upper surface 54, and along the outer circumference 58 is a handle 60 and a stop wall 62. The handle 60 is spaced apart from the stop wall 62. As shown in FIGS. 3 and 4, the handle 60 also extends downwards from the lower surface 56 of the disc 52. This lower extension 60a provides structural reinforcement to the disc 52. Adjacent the stop wall 62, and running partially around the outer circumference 58, are a plurality of teeth 64. An indented section 66 is located along the outer circumference 58 between the teeth 64 and the handle 60. Along the indented section 66 and raised from the upper surface 54, is a plurality of temperature indicating bumps 68. As shown in FIG. 2, one of the temperature indicating bumps 68, the calibration line 68a, is differentiated from the others by, in this example, extending the bump 68a upwards. This calibration line 68a allows the installer to properly align the rotational limit stop 50 within the flow control knob 20. In a preferred embodiment of the invention, each temperature-indicating bump 68 corresponds to approximately three degrees Fahrenheit on the temperature knob 80. Extending outwards from the outer circumference 58, and in the area of the handle 60 are a plurality of alignment teeth 69, for aligning the rotational limit stop 50 within the flow control knob 20.

As shown in FIG. 2, a central aperture 70 is located at the center of the disc 52. The valve sprocket 12 of valve assembly 10 extends upwards through both the flow control knob 20 and the rotational limit stop 50. As shown in FIG. 1, the central aperture 70 corresponds to the central opening 22. Extending radially outwards from the central aperture 70 is the disc surface 72. As shown in FIG. 3, the disc surface 72 includes a raised section 74 immediately adjacent the central aperture 70. Extending downwards from the disc surface 72 is a plurality of resilient spring legs 76. In the preferred embodiment illustrated in FIG. 4, four pairs of spring legs 76a, 76b, are spaced around the disc surface 72 of the rotational limit stop 50.

Preferably, the rotational limit stop 50 is constructed from an elastomeric or plastic material, for example a material marketed under the trade name "celanex." The material provides a certain resiliency to the spring legs 76 allowing the spring legs 76 to flex and properly accommodate the compression forces as the faucet is being assembled.

Figure 5:
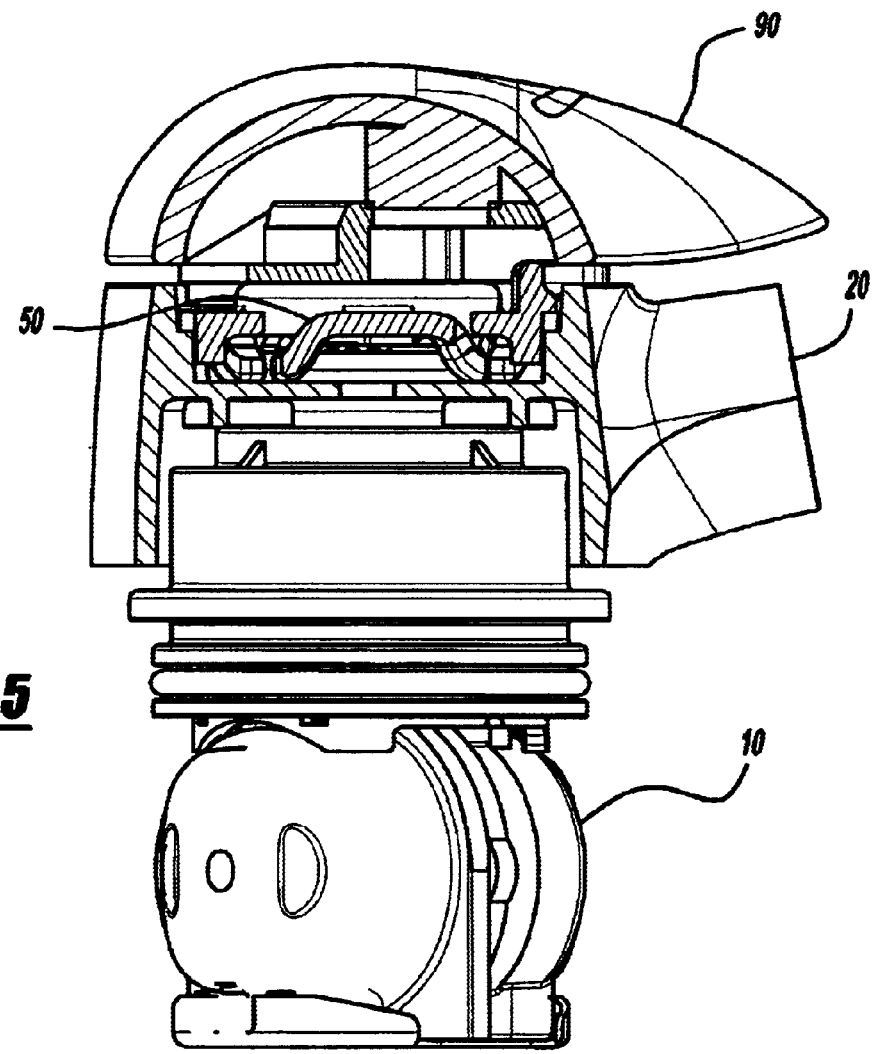
FIG. 5 is a partial cross sectional view of the spring-loaded disc according to the instant invention incorporated within a representative faucet assembly.

Referring to FIGS. 1 and 5, the faucet is assembled by fitting the flow control knob 20 onto the valve assembly 10, so that the valve sprocket 12 engages the mating ridges 34 of the flow control knob 20. The rotational limit stop 50 is aligned within the flow control knob 20 so that the calibration line 68a is lined up with the cold temperature stop 28 of the flow control knob 20. Further, the alignment teeth 68 are properly positioned within the volume control knob 20. The temperature knob 80 is then fitted on top of the rotational limit stop 50. In this preferred embodiment, a screw (not shown) is employed to secure the temperature knob 80 to the rotational limit stop 50. The temperature knob cover 90 is then snapped into place over the temperature knob 80. As is clear to anyone skilled in the art, the screw attachment means employed with temperature knob 80 and the snap fit employed with the temperature knob cover 90 may be substituted with other attaching and securing means.

While the invention has been described in what is considered to be a preferred embodiment, other variations and modifications will become apparent to those skilled in the art. It is intended, therefore, that the invention not be limited to the illustrative embodiment but be interpreted within the full spirit and scope of the appended claims.

What is claimed is:

1. A rotational limit stop comprising:
   a substantially circular disc having an upper surface, a lower surface and a perimeter surface, the perimeter surface containing a plurality of teeth on one portion thereof,
   a central aperture passing through the center of the circular disc, and
   a plurality of resilient spring legs extending downwards from the lower surface of the disc, such that the resilient spring legs of the rotational limit stop flex to accommodate the compression forces as a faucet assembly containing the rotational limit stop is being assembled.

2. The rotational limit stop according to claim 1, wherein the perimeter surface of the disc is divided into a teeth section containing the plurality of teeth, an indented section, and a smooth section.

3. The rotational limit stop according to claim 2, further comprising:
   a handle tab extending above and below the disc adjacent to the perimeter surface, the handle tab being situated in the smooth portion of the disc; and
   a stop wall also extending upwards from the upper surface of the disc adjacent the perimeter surface, the stop wall also being situated in the smooth portion of the disc but spaced apart from the handle tab.

4. The rotational limit stop according to claim 3, wherein the disc contains an annular portion immediately surrounding the central aperture, the annular portion being raised above the upper surface of the disc.

5. The rotational limit stop according to claim 4, further comprising:
   a plurality of temperature indicating bumps raised above the upper surface of the disc and situated in the indented portion of the disc; and
   a calibration line situated with, but distinguished from, the temperature indicating bumps.

6. The rotational limit stop according to claim 5, wherein the temperature indicating bumps are spaced apart such that each bump corresponds to approximately three degrees Fahrenheit when the rotational limit stop is installed within a faucet assembly.

7. The rotational limit stop according to claim 6, wherein the rotational limit stop is constructed as a single unit from an elastomeric material.

8. A faucet assembly comprising:
   a valve assembly having a valve sprocket extending axially therefrom, the valve sprocket having teeth around its perimeter;
   a flow control knob fitted onto the valve assembly, the flow control knob having 1) a central opening, the central opening having mating ridges around its perimeter, 2) a base surface extending radially from the central opening, 3) a perimeter lip surrounding the base surface, the perimeter lip having an inner surface, and 4) a plurality of engaging ridges along the inner surface of the perimeter lip, such that the valve sprocket extends through the central opening of the flow control knob;
   a rotational limit stop fitted within the flow control knob, the rotation limit stop comprising 1) a substantially circular disc having an upper surface, a lower surface and a perimeter surface, the perimeter surface containing a plurality of teeth, 2) a central aperture passing through the center of the circular disc, 3) a plurality of resilient spring legs extending downwards from the lower surface of the disc, such that the teeth around the perimeter surface engage the engaging ridges along the inner surface of the perimeter lip, thereby causing the rotational limit stop to rotate with the flow control knob;
   a temperature knob fitted onto of the rotational limit stop; and
   a temperature knob cover, covering the temperature knob, wherein the resilient spring legs of the rotational limit stop flex to accommodate the compression forces as the faucet assembly is being assembled.

9. The faucet assembly according to claim 8, wherein the disc of the rotational limit stop contains an annular portion immediately surrounding the central aperture, the annular portion being raised above the upper surface of the disc.

10. The faucet assembly according to claim 9, wherein the downwardly extending spring legs are situated outside of the raised annular portion of the disc.

11. The faucet assembly according to claim 10, further comprising:
    a plurality of temperature indicating bumps raised above the upper surface of the disc of the rotational limit stop, and situated in the indented portion of the disc; and
    a calibration line situated with, but distinguished from, the temperature indicating bumps.

12. The faucet assembly according to claim 11, wherein the rotational limit stop is constructed as a single unit from an elastomeric material.

* * * * *